(12) United States Patent
Aybay et al.

(10) Patent No.: US 9,602,439 B2
(45) Date of Patent: Mar. 21, 2017

(54) METHODS AND APPARATUS FOR FLOW CONTROL ASSOCIATED WITH A SWITCH FABRIC

(75) Inventors: Gunes Aybay, Los Altos, CA (US); Jaya Bandyopadhyay, San Jose, CA (US); Srinivas Gadgil, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 423 days.

(21) Appl. No.: 12/771,413

(22) Filed: Apr. 30, 2010

(65) Prior Publication Data

US 2011/0267942 A1 Nov. 3, 2011

(51) Int. Cl.
*H04L 12/24* (2006.01)
*H04L 12/931* (2013.01)
(Continued)

(52) U.S. Cl.
CPC ........ *H04L 49/506* (2013.01); *H04L 41/0816* (2013.01); *H04L 47/266* (2013.01); *H04L 47/30* (2013.01); *H04L 49/1515* (2013.01)

(58) Field of Classification Search
CPC ......... H04L 47/10; H04L 47/11; H04L 47/22; H04L 47/30; H04L 43/026; H04L 49/1515; H04L 47/26; H04L 49/505; H04L 47/266; H04L 2012/5635; H04L 47/12; H04L 12/569
(Continued)

(56) References Cited

U.S. PATENT DOCUMENTS 5,457,687 A 10/1995 Newman
5,926,473 A 7/1999 Gridley
(Continued)

FOREIGN PATENT DOCUMENTS

EP 1 892 905 A1 2/2008
GB 2 361 139 A 10/2001
(Continued)

OTHER PUBLICATIONS

English translation of JP-09-149065, translated by http://www4.ipdl.inpit.go.jp/Tokujitu/tjsogodben.ipdl?N0000=115.*
(Continued)

*Primary Examiner* — Khaled Kassim
*Assistant Examiner* — Zhaohui Yang
(74) *Attorney, Agent, or Firm* — Cooley LLP

(57) ABSTRACT

In some embodiments, an apparatus includes a switch fabric having at least a first switch stage and a second switch stage, an edge device operatively coupled to the switch fabric and a management module. The edge device is configured to send a first portion of a data stream to the switch fabric such that the first portion of the data stream is received at a queue of the second switch stage of the switch fabric via the first switch stage of the switch fabric. The management module is configured to send a flow control signal configured to trigger the edge device to suspend transmission of a second portion of the data stream when a congestion level of the queue of the second switch stage of the switch fabric satisfies a condition in response to the first portion of the data stream being received at the queue.

13 Claims, 6 Drawing Sheets

(51) Int. Cl.
*H04L 12/825* (2013.01)
*H04L 12/835* (2013.01)
*H04L 12/933* (2013.01)

(58) Field of Classification Search
USPC .................................................. 370/229–240
See application file for complete search history.

(56) References Cited

U.S. PATENT DOCUMENTS

| | | | |
|---|---|---|---|
| 5,987,028 A | 11/1999 | Yang et al. | |
| 5,991,295 A | 11/1999 | Tout et al. | |
| 6,049,546 A | 4/2000 | Ramakrishnan | |
| 6,073,089 A | 6/2000 | Baker et al. | |
| 6,370,145 B1 | 4/2002 | Dally et al. | |
| 6,512,747 B1 | 1/2003 | Umeuchi et al. | |
| 6,657,962 B1 | 12/2003 | Barri et al. | |
| 6,704,280 B1 * | 3/2004 | Mangin | H04L 47/10 370/230 |
| 6,907,041 B1 * | 6/2005 | Turner et al. | 370/412 |
| 6,944,173 B1 | 9/2005 | Jones et al. | |
| 6,973,032 B1 * | 12/2005 | Casley et al. | 370/230 |
| 6,986,161 B2 | 1/2006 | Billhartz | |
| 7,027,457 B1 * | 4/2006 | Chiussi et al. | 370/414 |
| 7,046,631 B1 | 5/2006 | Giroux et al. | |
| 7,061,862 B2 | 6/2006 | Horiguchi et al. | |
| 7,075,934 B2 | 7/2006 | Chiussi et al. | |
| 7,085,846 B2 * | 8/2006 | Jenne et al. | 709/232 |
| 7,173,931 B2 | 2/2007 | Chao et al. | |
| 7,185,368 B2 | 2/2007 | Copeland, III | |
| 7,230,947 B1 | 6/2007 | Huber et al. | |
| 7,233,568 B2 | 6/2007 | Goodman et al. | |
| 7,234,168 B2 | 6/2007 | Gupta et al. | |
| 7,277,429 B2 | 10/2007 | Norman et al. | |
| 7,283,471 B2 * | 10/2007 | Gutierrez et al. | 370/230 |
| 7,327,680 B1 | 2/2008 | Kloth | |
| 7,391,736 B2 | 6/2008 | Na et al. | |
| 7,403,524 B2 | 7/2008 | Hill | |
| 7,424,744 B1 | 9/2008 | Wu et al. | |
| 7,430,175 B2 | 9/2008 | Dropps et al. | |
| 7,440,448 B1 * | 10/2008 | Lu et al. | 370/380 |
| 7,519,860 B2 | 4/2009 | Hatonen et al. | |
| 7,540,025 B2 | 5/2009 | Tzadikario | |
| 7,543,052 B1 | 6/2009 | Cesa Klein | |
| 8,154,996 B2 * | 4/2012 | Godbole et al. | 370/229 |
| 2002/0064170 A1 | 5/2002 | Siu et al. | |
| 2002/0075805 A1 * | 6/2002 | Gupta et al. | 370/235 |
| 2002/0080789 A1 | 6/2002 | Henderson et al. | |
| 2002/0118692 A1 | 8/2002 | Oberman et al. | |
| 2002/0136163 A1 * | 9/2002 | Kawakami et al. | 370/229 |
| 2002/0154637 A1 | 10/2002 | Keller-Tuberg | |
| 2003/0005145 A1 | 1/2003 | Bullard | |
| 2003/0026287 A1 | 2/2003 | Mullendore et al. | |
| 2003/0058880 A1 | 3/2003 | Sarkinen | |
| 2003/0115355 A1 * | 6/2003 | Cometto | H04L 47/12 709/234 |
| 2004/0013124 A1 | 1/2004 | Peebles et al. | |
| 2004/0165598 A1 | 8/2004 | Shrimali et al. | |
| 2005/0013251 A1 * | 1/2005 | Wang | H04L 47/10 370/235 |
| 2005/0108444 A1 * | 5/2005 | Flauaus et al. | 710/15 |
| 2005/0111460 A1 | 5/2005 | Sahita | |
| 2005/0210533 A1 | 9/2005 | Copeland et al. | |
| 2005/0226156 A1 | 10/2005 | Keating et al. | |
| 2006/0123480 A1 | 6/2006 | Oh et al. | |
| 2006/0272018 A1 | 11/2006 | Fouant | |
| 2006/0285548 A1 | 12/2006 | Hill et al. | |
| 2007/0064617 A1 | 3/2007 | Reves | |
| 2007/0067438 A1 | 3/2007 | Goranson et al. | |
| 2007/0086464 A1 | 4/2007 | Somashekhar | |
| 2007/0094729 A1 | 4/2007 | Hoefelmeyer et al. | |
| 2007/0118909 A1 | 5/2007 | Hertzog et al. | |
| 2007/0150949 A1 | 6/2007 | Futamura et al. | |
| 2007/0180526 A1 | 8/2007 | Copeland, III | |
| 2007/0192861 A1 | 8/2007 | Varghese et al. | |
| 2007/0240207 A1 | 10/2007 | Belakhdar et al. | |
| 2008/0028096 A1 * | 1/2008 | Henderson et al. | 709/236 |
| 2008/0080548 A1 | 4/2008 | Mullendore et al. | |
| 2008/0082977 A1 | 4/2008 | Araujo et al. | |
| 2008/0151863 A1 | 6/2008 | Lawrence et al. | |
| 2008/0259798 A1 | 10/2008 | Loh et al. | |
| 2008/0263661 A1 | 10/2008 | Bouzida | |
| 2008/0285449 A1 | 11/2008 | Larsson et al. | |
| 2009/0003212 A1 | 1/2009 | Kwan et al. | |
| 2009/0077663 A1 | 3/2009 | Sun et al. | |
| 2010/0061238 A1 * | 3/2010 | Godbole et al. | 370/235 |
| 2010/0061239 A1 * | 3/2010 | Godbole et al. | 370/235 |
| 2010/0061390 A1 | 3/2010 | Godbole et al. | |
| 2010/0158031 A1 | 6/2010 | Thomas et al. | |

FOREIGN PATENT DOCUMENTS

| | | | | |
|---|---|---|---|---|
| JP | 09-149065 | * | 6/1997 | H04L 12/44 |
| WO | WO 97/04546 | | 2/1997 | |

OTHER PUBLICATIONS

Search Report for European Application No. 09170041.9, mailed Nov. 23, 2009 (8 pages).
Office Action mailed Mar. 26, 2010 for U.S. Appl. No. 12/242,224 (17 pages).
Office Action mailed Mar. 29, 2010 for U.S. Appl. No. 12/242,230 (11 pages).
Office Action mailed Apr. 29, 2010 for U.S. Appl. No. 12/343,728 (21 pages).
Office Action mailed May 11, 2010 for U.S. Appl. No. 12/345,490 (12 pages).
F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
William J. Dally, "Virtual-Channel Flow Control," IEEE Transactions on Parallel and Distributed Systems, vol. 3, No. 2, Mar. 1992, pp. 194-205.
U.S. Appl. No. 12/345,490, filed Dec. 29, 2008, entitled "Flow-Control in a Switch Fabric" (38 pgs).
U.S. Appl. No. 12/646,114, filed Dec. 23, 2009, entitled "Methods and Apparatus for Tracking Data Flow Based on Flow State Values" (50 pgs).
U.S. Appl. No. 12/820,797, filed Jun. 22, 2010, entitled "Methods and Apparatus for Virtual Channel Flow Control Associated with a Switch Fabric" (54 pgs).

* cited by examiner

METHODS AND APPARATUS FOR FLOW CONTROL ASSOCIATED WITH A SWITCH FABRIC

BACKGROUND

Embodiments described herein relate generally to flow control, and, in particular, to flow control associated with multi-staged switch fabrics.

Transmission of data from a transmitter to a receiver via a physical link (e.g., an Ethernet link) can be, for example, disrupted because of congestion at a queue configured to receive the data. In some instances, the disruption can cause head-of-line (HOL) blocking and/or result in the loss of at least portions of the data due to buffer overflow. Known flow control protocols such as Ethernet pause (Institute of Electrical and Electronics Engineers (IEEE) 802.3x) and priority pause (IEEE 802.1 Qbb) can be used to substantially prevent buffer overflow in some applications, and quantized congestion notification (QCN) (IEEE 802.1Qau) can be used for management of data congestion within a multi-hop network that has relatively steady data flows. These known flow control protocols, however, may not adequately resolve congestion issues related to multi-stage queues and/or may not adequately handle the rapid onset of congestion within a hop-by-hop network link caused by, for example, bursts of data.

Thus, a need exists for methods and apparatus for data flow control between modules associated with a hop-by-hop network link.

SUMMARY OF THE INVENTION

In some embodiments, an apparatus includes a switch fabric having at least a first switch stage and a second switch stage, an edge device operatively coupled to the switch fabric and a management module. The edge device is configured to send a first portion of a data stream to the switch fabric such that the first portion of the data stream is received at a queue of the second switch stage of the switch fabric via the first switch stage of the switch fabric. The management module is configured to send a flow control signal configured to trigger the edge device to suspend transmission of a second portion of the data stream when a congestion level of the queue of the second switch stage of the switch fabric satisfies a condition in response to the first portion of the data stream being received at the queue.

DETAILED DESCRIPTION

Figure 1:
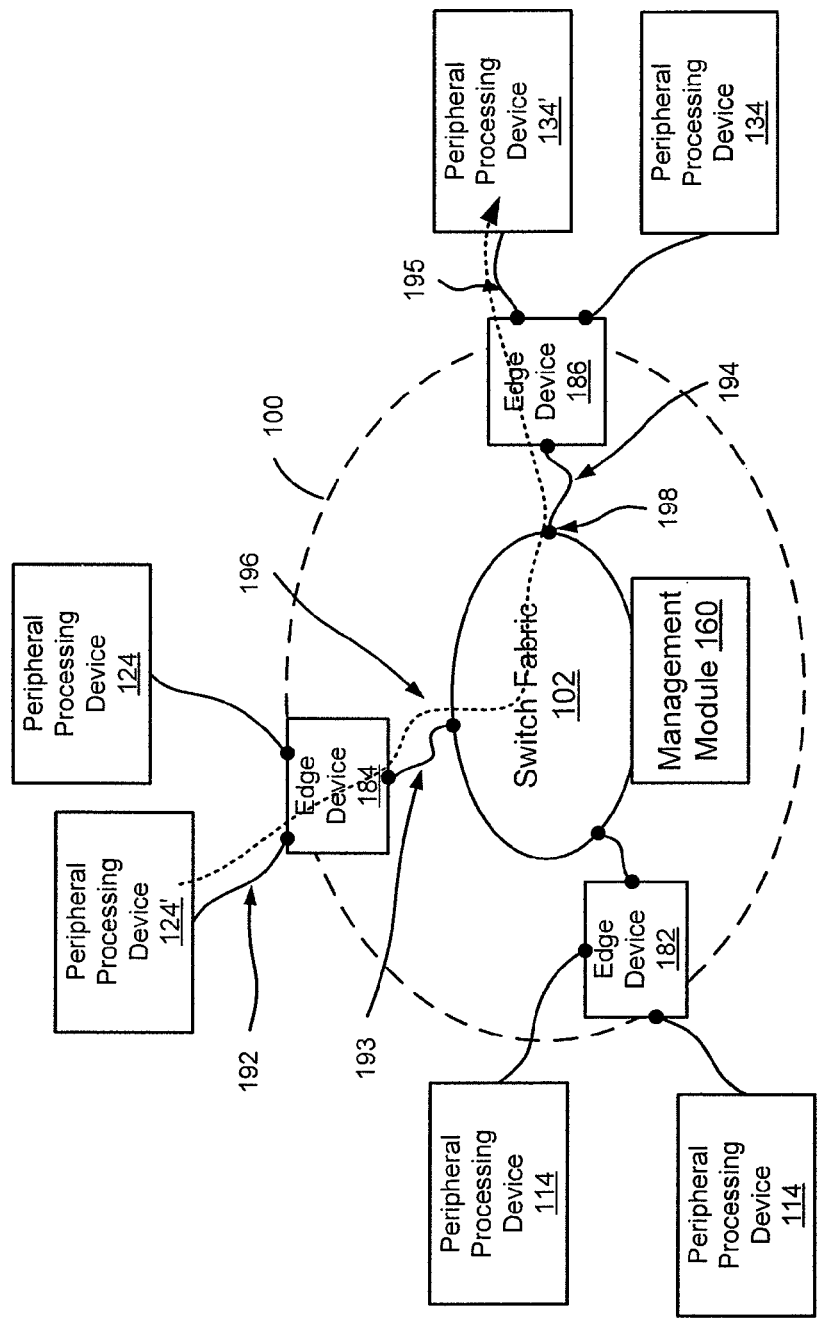
FIG. 1 is a system block diagram of a switch fabric system, according to an embodiment.

In some embodiments, an apparatus includes a switch fabric having at least a first switch stage and a second switch stage, an edge device operatively coupled to the switch fabric and a management module. The edge device is configured to send a first portion of a data stream to the switch fabric such that the first portion of the data stream is received at a queue of the second switch stage of the switch fabric via the first switch stage of the switch fabric. The management module is configured to send a flow control signal configured to trigger the edge device to suspend transmission of a second portion of the data stream when a congestion level of the queue of the second switch stage of the switch fabric satisfies a condition in response to the first portion of the data stream being received at the queue.

Flow of data (e.g., a data packet such as an internet protocol (IP) packet, a cell of data, etc.) via a link between stages of queues at a source entity and stages of queues at a destination entity can be controlled based on flow control signaling associated with multiple flow control loops. For example, if the destination entity (or a portion thereof) is unable to handle a flow of data from the source entity because the destination entity has limited buffering capability relative to the amount of data being sent, the destination entity can send a flow control signal associated with at least one of the flow control loops to the source entity. The flow control signal can be configured to trigger the source entity to suspend transmission of the flow of data to the destination entity. In some embodiments, the link between the source entity and the destination entity can be a physical link and can be associated with a single network hop (e.g., a network step that cannot be defined topographically, or a network step associated with a link between one media access control (MAC) device and another MAC device). In some embodiments, the source entity can be referred to as a transmitter and a destination entity can be referred to as a receiver.

Flow control loops associated with a link can be defined so that flow control signaling associated with the flow control loops can affect different portions of stages of queues spanning the link. For example, a flow control signal associated with a first control loop can trigger suspension of data transmission from a single source device (e.g., peripheral processing device) queue operatively coupled to an edge device. A flow control signal associated with a second control loop can trigger suspension of data transmission from multiple source device queues operatively coupled to the edge device. A flow control signal associated with a third control loop can trigger suspension of data transmission from the edge device to the switch fabric. In sum, the flow control signal associated with the first control loop can trigger different (e.g., more granular) data flow control than the flow control signal associated with the second control loop and the third control loop. Similarly, the flow control signal associated with the second control loop can trigger different (e.g., more granular) data flow control than the flow control signal associated with the third control loop.

FIG. 1 is a schematic diagram that illustrates a switch fabric system 100, according to an embodiment. The switch fabric system 100 includes a switch fabric 102; multiple edge devices 182, 184, 186; and a management module 160. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186 is a direct link. Such a link can be said to be a single-hop link. In other embodiments, the peripheral processing devices can be operatively coupled to the edge devices via intermediate modules. Such a connection can be said to be a multiple-hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing device 114, 124, 134.

In some embodiments, the edge devices 182, 184, 186 can be a combination of hardware modules and software modules. In some embodiments, for example, each edge device 182, 184, 186 can be a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb ethernet interface) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send to and/or receive signals from the switch fabric 102 based on one or more protocols (e.g., an Ethernet protocol, a multi-protocol label switching (MPLS) protocol, a fibre channel protocol, a fibre-channel-over Ethernet protocol, an Infiniband-related protocol).

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can define a core portion of a data center.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). The switch fabric 102 can be configured to connect (e.g., facilitate communication between) the peripheral processing devices 114, 124, 134. In some embodiments, the switch fabric 102 can be configured to communicate via interface devices configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch. More details related to architecture of the switch fabric 102 are described herein.

The management module 160 can be a combination of hardware and software configured to manage the resources (e.g., resources of the switch fabric 102) within the switch fabric system 100. For example, in some embodiments, the management module 160 can control the flow of data packets through the switch fabric system 100 (e.g., from a peripheral processing device 114, 124, 134 to another peripheral processing device 114, 124, 134). In such embodiments, the management module 160 can define and send flow control signals (e.g., flow control packets) to the edge devices 182, 184, 186. Such flow control signals can cause an edge device 182, 184, 186 to suspend sending data packets to the switch fabric 102. The flow control signals can be generated and sent by the management module 160 in response to the available capacity of an output buffer within a module of the switch fabric dropping below a predetermined threshold (e.g., the buffer is 50% full, greater than a predetermined number of packets are in the buffer, etc.). In some embodiments, multiple predetermined thresholds can be defined such that a different flow control signal is generated and sent when the available capacity of the output buffer drops below each threshold, as further described in detail herein. In some embodiments, the flow control signals can also cause an edge device 182, 184, 186 to resume sending data packets to the switch fabric 102. Such flow control signals can be part of an first control loop, a second control loop and/or a third control loop, as further described in detail herein.

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102. The data packet is sent through port 198 to the edge device 186 via link 194. The edge device 186 can then send the data packet to the second peripheral processing device 134' via link 195.

If the data packet causes the available capacity of a buffer within the switch fabric 102 to drop below a predetermined threshold (e.g., the buffer is 50% full, greater than a predetermined number of packets are in the buffer, etc.), the management module 160 can generate and send a flow control signal to the edge device 184. In some embodiments, the buffer can define multiple thresholds. For example, if the data packet causes the available capacity of a buffer at an output port 198 of the switch fabric 102 to drop below a first threshold, the management module 160 can send a flow control signal to the edge device 184 suspending the edge device 184 from sending subsequent data packets received from peripheral processing device 124' to the edge device 184, thus reducing the number of data packets sent to the switch fabric 102. Such a first threshold can be part of a first control loop, as described in further detail herein.

Similarly, if the data packet causes the available capacity of a buffer at an output port 198 of the switch fabric 102 to drop below a second threshold or a third threshold, the management module 160 can send a flow control signal to the edge device 184 suspending the edge device 184 from sending subsequent data packets received from a set of peripheral processing devices 124 to the edge device 184 or suspending the edge device 184 from sending any subsequent data packets to the switch fabric 102, respectively, thus further reducing the number of data packets sent to the switch fabric 102. Such a second threshold can be part of a second control loop and such a third threshold can be part of a third control loop, as described in further detail herein. Reducing the number of data packets sent to the switch fabric 102 reduces congestion in the switch fabric 102 and allows the contents of the buffer to be reduced below the thresholds.

Figure 2:
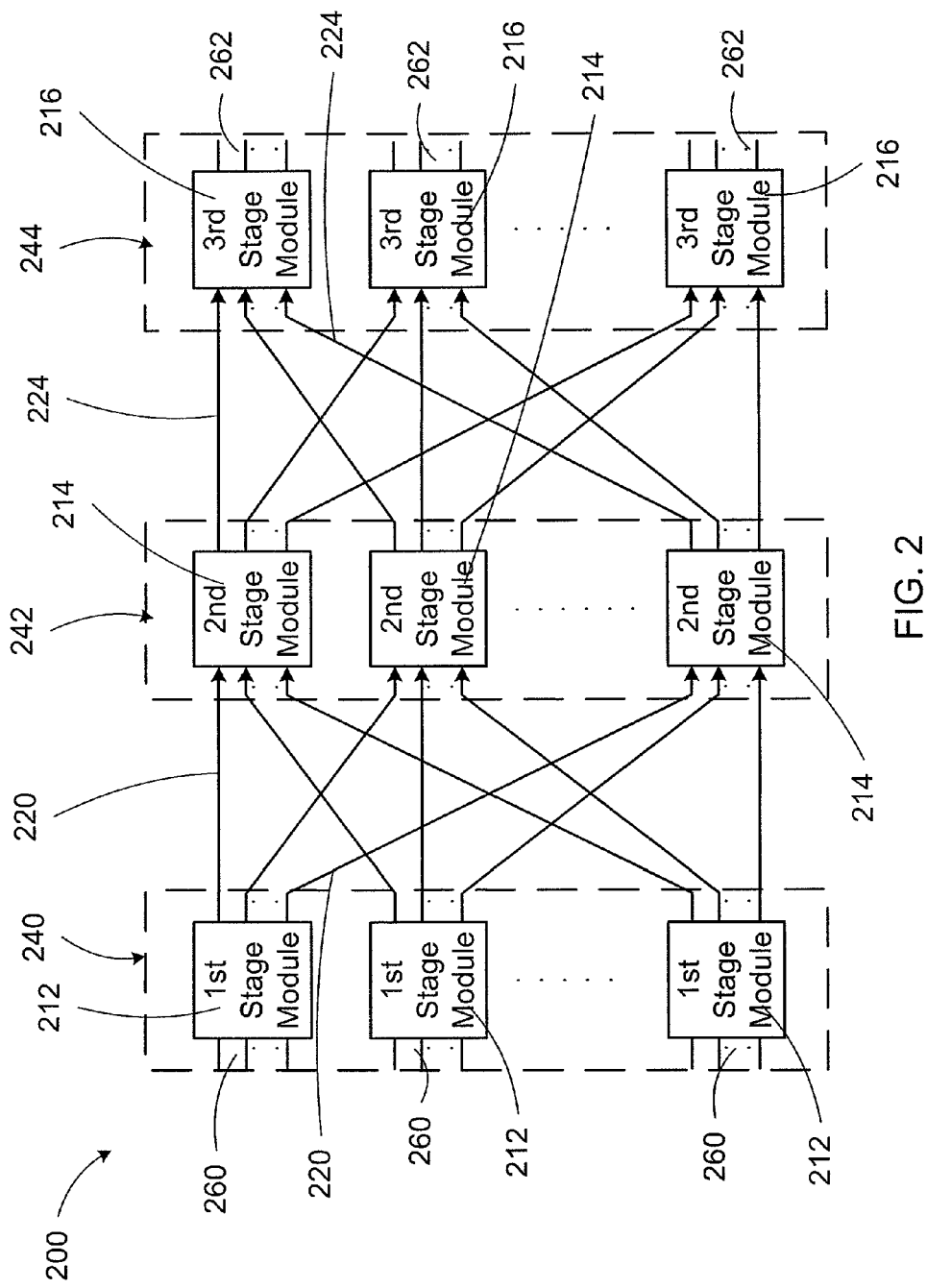
FIG. 2 is a schematic illustration of a switch fabric, according to another embodiment.

FIG. 2 is a schematic illustration of a switch fabric 200, according to an embodiment. The switch fabric 200 can define a core portion of a data center. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240.

Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

Figure 3A:
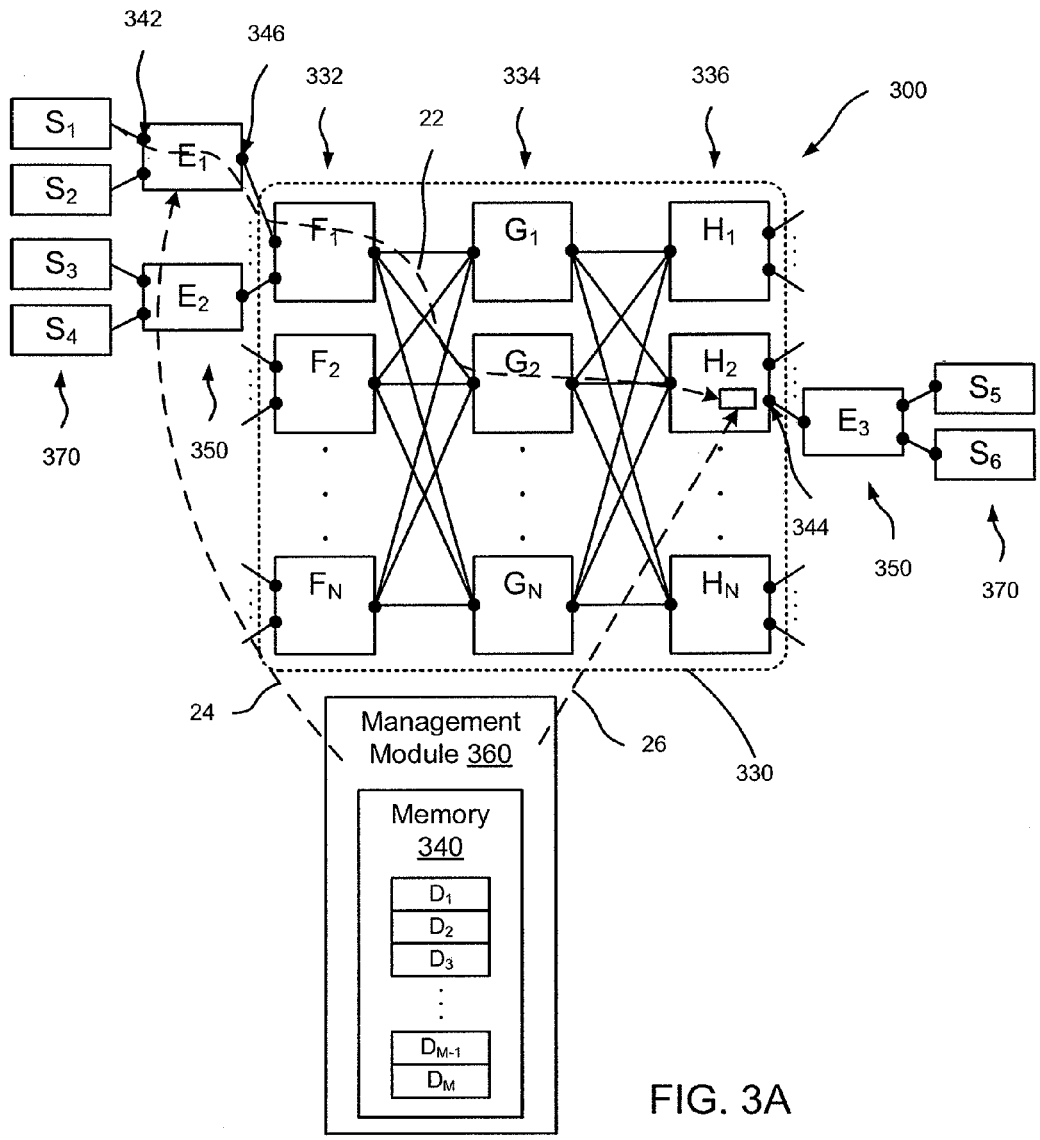
FIG. 3A is a system block diagram of a switch fabric system, according to another embodiment.

FIG. 3A is schematic illustration of a switch fabric system 300, according to another embodiment. The switch fabric system 300 includes a switch fabric 330, multiple edge devices 350 operatively coupled to the switch fabric 330, multiple peripheral processing devices 370 operatively coupled to the edge devices 350, a management module 360 and a memory 340. As described in further detail herein, a first peripheral processing device 370 (e.g., $S_1$) is configured to send a data packet to a second peripheral processing device 370 (e.g., $S_6$) via a first edge device 350 (e.g., $E_1$), the switch fabric 330, and a second edge device 350 (e.g., $E_3$).

The switch fabric 330 can be structurally and functionally similar to the switch fabric 200. Accordingly, the switch fabric includes modules $F_1$-$F_N$ associated with a first stage 332 of the switch fabric 330, modules $G_1$-$G_N$ associated with a second stage 334 of the switch fabric 330, and modules $H_1$-$H_N$ associated with a third stage 336 of the switch fabric. Each module $F_1$-$F_N$ associated with the first stage 332 is operatively coupled to each module $G_1$-$G_N$ associated with the second stage 334 via data paths. Similarly, each module $G_1$-$G_N$ associated with the second stage 334 is operatively coupled to each module $H_1$-$H_N$ associated with the third stage 336. The data paths between the modules $F_1$-$F_N$ associated with the first stage 332 and the modules $G_1$-$G_N$ associated with the second stage 334 and/or the data paths between the modules $G_1$-$G_N$ associated with the second stage 334 and the modules $H_1$-$H_N$ associated with the third stage 336 can be constructed in any manner configured to facilitate data transfer. In some embodiments, for example, the data paths include optical connectors, optical fibers and/or electrical connectors between the modules. In some embodiments, the data paths are within a midplane or a backplane.

As described in further detail herein, each module of the switch fabric 330 includes a queue (e.g., a buffer). Each queue is configured to buffer the data packets received by an input port of a module until a specified output port of the module is ready to send the data packet to the next stage of the switch fabric 330 or an edge device 350. In some embodiments, each queue operates as a first-in first-out (FIFO) buffer. In such embodiments, the data packets are sent to the next stage of the switch fabric 330 or an edge device 350 in the order received by the module. In other embodiments, data packets can be assigned a priority level, with those data packets with a high priority level being moved to the front of the queue or stored in separate priority-based queues. As described in further detail herein, if the capacity of a queue exceeds one or more predetermined thresholds, the management module 360 can send a flow control packet to one or more edge devices 350 instructing the one or more edge devices 350 to suspend sending data packets via a particular port for a period of time.

The peripheral processing devices 370 can be, for example, compute nodes, service nodes, routers, and storage nodes, as described in further detail herein. In some embodiments, for example, the peripheral processing devices 370 include servers, storage devices, gateways, workstations, and/or the like. The peripheral processing devices 370 can be operatively coupled to the edge devices 350 using any suitable connection such as, for example, an optical connection (e.g., an optical cable and optical connectors), an electrical connection (e.g., an electrical cable and electrical connectors) and/or the like. As such, the peripheral processing devices 370 are configured to send data (e.g., data packets, data cells, etc.) to the edge devices 350.

The edge devices 350 can be any devices configured to operatively couple peripheral processing devices 370 to the switch fabric 330. In some embodiments, for example, the edge devices 350 can be access switches, input/output modules, top-of-rack devices and/or the like. Edge devices $E_1$ and $E_2$ are schematically shown as source edge devices and edge device $E_3$ is schematically shown as a destination edge device for illustration purposes only. Structurally, the edge devices 350 (including $E_1$, $E_2$, and $E_3$) can function as source edge devices and destination edge devices. Accordingly, the edge devices 350 can send data to and receive data from the switch fabric 330.

While shown in FIG. 3A as being operatively coupled to a single module $F_1$ associated with the first stage 332, the edge device $E_1$ can be coupled to any number of modules associated with the first stage 332. Additionally, while shown in FIG. 3A as being operatively coupled to a single switch fabric 330, the edge device $E_1$ can be operatively coupled to any number of switch fabrics, similar to switch fabric 330. In some embodiments, for example, the edge device $E_1$ can be both coupled to the module $F_1$ associated with the first stage of the switch fabric 330 and a module associated with a first stage of a second switch fabric (not shown in FIG. 3A). In such embodiments, the edge device $E_1$ can send data to either the module $F_1$ or the module associated with the first stage of the second switch fabric.

Figure 3B:
FIG. 3B is a schematic illustration of a data packet, according to an embodiment.
Figure 3C:
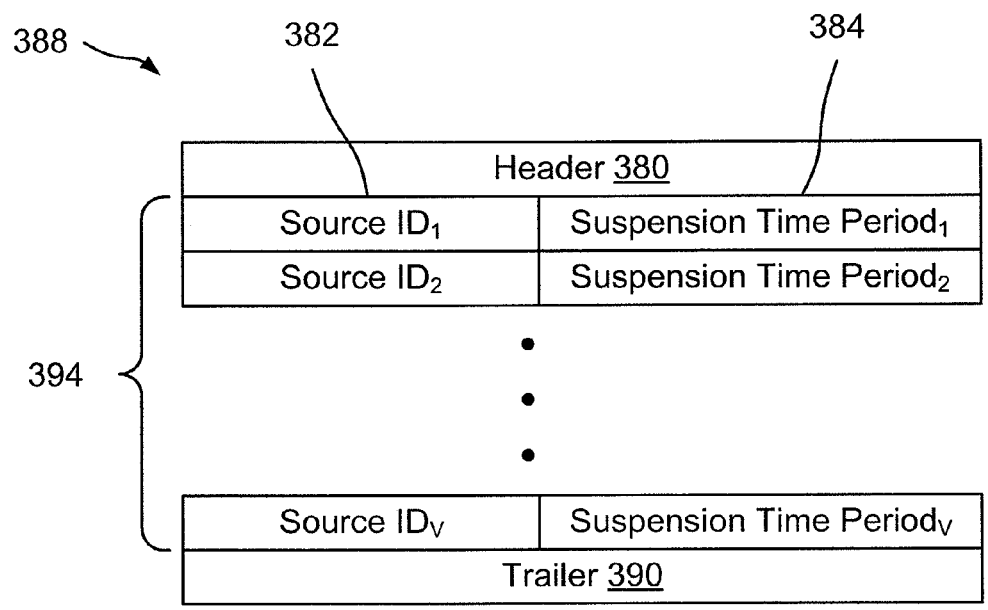
FIG. 3C is a schematic illustration of a flow control packet, according to an embodiment.
Figure 3D:
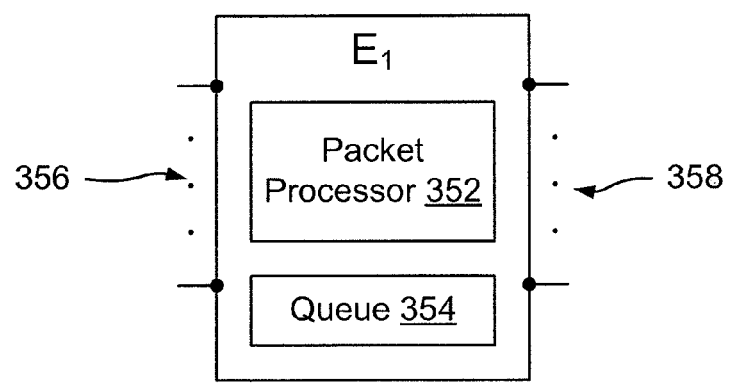
FIG. 3D is a schematic illustration of an edge device from the switch fabric system shown in FIG. 3A.

FIG. 3D is a schematic illustration of an edge device such as the edge device $E_1$ of the switch fabric system 300. The edge device $E_1$ includes a packet processor 352, a queue 354, input ports 356 and output ports 358. The input ports 356 can be any ports suitable to receive data packets from and send data packets to a peripheral processing device 370. Similarly, the output ports 358 can be any ports suitable to send data packets to and receive data packets from a switch fabric 330. Both the input ports 356 and the output ports 358 can be referred to network ports.

The packet processor 352 can be configured to prepare a data packet to enter the switch fabric 330. For example, the packet processor 352 can be configured to forward, classify, and/or modify the packet encapsulation of a data packet prior to sending the data packet to the switch fabric 330. In some embodiments, for example, the edge device 350 can append a source identifier (e.g., source identifier 23 of FIG. 3B) to the data packet (e.g., data packet 25 of FIG. 3B). The source identifier 23 can be a reference to a port of the edge device 350 (e.g., port 346 of edge device $E_1$) through which the data packet 25 with the appended source identifier 23 will be sent to a module (e.g., module $F_1$) associated with the first stage 332 of the switch fabric 330.

The queue 354 of the edge device $E_1$ is a memory buffer through which the input ports 356 are coupled to the output ports 358. In some embodiments, for example, each input port 356 is operatively coupled to write interfaces on the queue 354 and each output port is operatively coupled to read interfaces on the queue. In some embodiments, the queue 354 can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period.

The queue 354 is similar to the queues described above with respect to the modules of the switch fabric 330. As such, the queue 354 is configured to buffer the data packets received from the peripheral processing devices 370 until a specified output port 358 is ready to send the data packet to the switch fabric 330. For example, the queue 354 of the edge device $E_1$ stores a data packet to be sent to $F_1$ via output port 346 until the output port 346 is free and/or it is the data packet's turn to be sent. In some embodiments, the queue 354 operates as a first-in first-out (FIFO) buffer. In such embodiments, the data packets are sent via the output ports 358 in the order received via the input ports 356. In other embodiments, data packets can be assigned a priority level, with those data packets with a high priority level being moved to the front of the queue 354 or queue 354 can be structured with multiple priority-based queues.

While shown in FIG. 3D as having a single queue 354, in other embodiments the edge device $E_1$ can have multiple queues. In such embodiments, for example, the edge device $E_1$ can have a queue for each input port 356. This allows the edge device $E_1$ to easily suspend sending data packets received from a particular peripheral processing device (e.g., the data packets contained within a particular queue). Additionally, this allows the edge device $E_1$ to easily prioritize the data packets received from particular peripheral processing devices (e.g., send the data packets within a particular queue before the data packets in another queue). In some embodiments, the edge device $E_1$ can include multiple queues for each output port 358.

While shown in FIG. 3A as being operatively coupled to a single module $F_1$ associated with the first stage 332, the edge device $E_1$ can be coupled to any number of modules associated with the first stage 332. Additionally, while shown in FIG. 3A as being operatively coupled to a single switch fabric 330, the edge device $E_1$ can be operatively coupled to any number of switch fabrics, similar to switch fabric 330. In some embodiments, for example, the edge device $E_1$ can be both coupled to the module $F_1$ associated with the first stage of the switch fabric 330 and a module associated with a first stage of a second switch fabric (not shown in FIG. 3). In such embodiments, the edge device $E_1$ can send data to either the module $F_1$ or the module associated with the first stage of the second switch fabric.

Returning to FIG. 3A, the management module 360 can be a combination of hardware modules and software modules configured to manage the resources (e.g., resources of the switch fabric 330) within the switch fabric system 300. In some embodiments, for example, the management module 360 can be a field-programmable gate array (FPGA), an application specific integrated circuit (ASIC), a digital signal processor (DSP) and/or the like.

The management module 360 coordinates flow control for data packets sent through the switch fabric system 300 (e.g., from a peripheral processing device 370 to another peripheral processing device 370). As such, the management module 360 can define and send flow control signals to the peripheral processing devices 370 and/or the edge devices 350. Such flow control signals can cause an edge device 350 to suspend sending data packets received from a single peripheral processing device (e.g., $S_1$), data packets received from multiple peripheral processing devices (e.g., $S_1$ and $S_2$) or data packets received from all the peripheral processing devices to which the edge device is coupled.

In some embodiments, the management module 360 is operatively coupled to the edge devices 350 via a direct connection. Similarly stated, the management module 360 can communicate with the edge devices 350 without sending signals through other modules within the switch fabric system 300. As such, the management module 360 can communicate with the edge devices 350 via a communication channel out-of-band from the communication channels of the switch fabric 330. In such embodiments, the management module 360 sends flow control packets to the edge devices via the direct connection. In other embodiments, the management module 360 is operatively coupled to the edge devices 350 via other modules within the switch fabric system 300. In such embodiments, for example, the management module 360 sends flow control packets to the edge devices using the other connections of the switch fabric system 300. For example, the management module 360 can send flow control packets to edge device $E_1$ via the connection between edge device $E_1$ and module $F_1$.

FIG. 3C is a schematic diagram that illustrates a flow control packet 388 configured to be sent as a flow control signal, according to an embodiment. The flow control packet 388 includes a header 380, a trailer 390, and a payload 394 that includes suspension-time-period parameter values (shown in column 384) for several transmit queues and/or ports (e.g., queues and/or ports on an edge device 350) represented by source identifiers (shown in column 382). As shown in FIG. 3C, source identifiers represented by source IDs 1 through V (i.e., Source $ID_1$ through Source $ID_V$) are each associated with a suspension-time-period parameter value 1 through V (i.e., Suspension Time $Period_1$ through Suspension Time $Period_V$). The suspension-time-period parameter values 384 indicate time periods during which transmit queues and/or ports represented by the source IDs 382 should be suspended (e.g., prohibited) from transmitting data.

As discussed above, the flow control packet 388 can be defined at the management module 360. In some embodiments, the management module 360 can be configured to define a flow control packet 388 at random times, when a suspension-time-period parameter value has been requested and/or calculated, and/or when a specified number of suspension-time-period parameter values have been requested and/or calculated. In some embodiments, the management module 360 can determine that at least a portion of the flow control packet 388 should not be defined and/or sent, for example, based on one or more parameter values and/or state information accessed by the management module 360.

In some embodiments, the flow control packet 388 can be defined by the management module 360 in response to the available capacity of a queue within a module of the switch fabric dropping below a predetermined threshold (e.g., the queue is 50% full, the queue is 75% full, etc.). In some embodiments, multiple predetermined thresholds can be defined such that a different flow control signal is generated and sent when the available capacity of the queue drops below each threshold. In such embodiments, for example, the payload 394 of the flow control packet 388 can include a priority level identification (ID) (not shown in FIG. 3C) having a value associated with the threshold that the available capacity of the queue dropped below. For example, if the available capacity drops below a first threshold, a first priority level ID can be sent configured to induce a first suspension action. Similarly, if the available capacity drops below a second threshold, a second priority level ID can be sent to induce a second suspension action. In such embodiments, for example, the second suspension action can reduce the number of data packets sent to the switch fabric more than the first suspension action, as described in further detail herein. In some embodiments, the flow control signals can also cause an edge device 350 to resume sending data packets to the switch fabric 330. The flow control signals can be part of a first control loop, a second control loop and/or a third control loop, as further described in detail herein.

Although not shown, in some embodiments, multiple source IDs 382 can be associated with a single suspension-time-period parameter value 384. In some embodiments, at least one source ID 382 can be associated with a parameter value other than a suspension-time-period parameter value 384. For example, a queue ID can be associated with a flow rate parameter value. The flow rate parameter value can indicate a flow rate (e.g., a maximum flow rate) at which transmit queues and/or ports should transmit data. In some embodiments, the flow control packet 388 can have one or more fields configured to indicate whether or not a particular receive queue is available to receive data.

In some embodiments, the flow control packet can be defined based on a layer-2 (e.g., layer-2 of the open systems interconnection (OSI) model) protocol. In other words, the flow control packet can be defined at and used within layer-2 of a network system. In some embodiments, the flow control packet can be transmitted between devices associated with layer-2 (e.g., a MAC device).

In addition to sending the flow control packet to the edge device $E_1$, the management module 360 can store the flow control packet and/or an indication of an action to be taken by the flow control packet in the memory 340. This enables the memory 340 to maintain a history of the flow control signals sent. This also enables the memory 340 to maintain information about the status of the edge devices 350. Such information can include, for example, whether an edge device $E_1$ has suspended sending data to the switch fabric 330, when the suspension will expire and the type of suspension (e.g., first, second, or third). Before sending a flow control packet to an edge device, the management module 360 can search the memory 340 to determine whether an unexpired (e.g., within the suspension time period) flow control packet of the same type and suspending the same port 346 has already been sent. Similarly stated, the management module 360 can determine whether the edge device $E_1$ has already suspended sending data packets via port 346 and the type of suspension (e.g., first, second, or third). If a flow control packet suspending the port 346 has already been sent to the edge device $E_1$ and the suspension time period has not expired, the management module 360 will not send a flow control packet to the edge device $E_1$. Checking the memory prior to sending flow control packets can prevent the management module 360 from sending unnecessary and/or duplicate flow control packets.

In use, for example, a peripheral processing device $S_1$ can be configured to send a data packet to another peripheral processing device $S_6$. FIG. 3A represents the peripheral processing device $S_1$ sending a data packet to peripheral processing device $S_6$ by way of example. Any peripheral processing device 370 operatively coupled to the switch fabric 330 via an edge device 350 can be configured to send a data packet to any other peripheral processing device 370 coupled to the switch fabric 330 via an edge device 350.

The peripheral processing device $S_1$ can send the data packet to the edge device $E_1$ via port 342. In some embodiments, the data packet can include a payload and a header. The payload can include data to be sent to peripheral processing device $S_6$. The header can include identifying information. In some embodiments, for example, the header can include at least a portion of an IP 5-tuple. In such embodiments, for example, the header can include a destination MAC address, a destination internet protocol (IP) address, a source MAC address, a source IP address and/or a transfer protocol. In the present example, the destination MAC address and the destination IP address can be associated with peripheral processing device $S_6$, and the source MAC address and the source IP address can be associated with peripheral processing device $S_1$. Such information can be used in conjunction with a lookup table to route the data packet through the switch fabric 330 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 330 can ensure that each data packet originating from a particular source to be sent to a particular destination will be sent through the switch fabric 330 via the same path (e.g., through the same modules associated with each stage of the switch fabric 330).

A source identifier 23 (see, e.g., FIG. 3B) containing an identifier associated with the source port (e.g., port 346 through which the edge device $E_1$ will send the data packet 25 to the switch fabric 330) is appended to the data packet 25. As described in further detail herein, the source identifier 23 can be used to identify from which port 346 the data packet 25 originated when the management module 360 defines and sends a flow control packet 388 based on the data packet 25. In some embodiments, a destination identifier (not shown in FIG. 3B) containing an identifier associated with a destination network port (e.g., port 344) and/or an identifier associated with a destination edge device $E_3$ can be appended to the data packet 25. The destination identifier can be used in routing the data packet through the switch fabric 330. Similarly stated, the data packet can be routed through the switch fabric 330 based on the destination identifier representing the destination network port 344 and/or the destination edge device $E_3$.

Using the information contained within the header of the data packet 25, the edge device $E_1$ can determine to which module $F_1$-$F_N$ to send the data packet 25. In some embodiments, for example, the edge device $E_1$ can use a hash function using as inputs the destination MAC address, the destination IP address, the source MAC address, the source IP address, and/or the transfer protocol to determine to which module $F_1$-$F_N$ to send the data packet 25.

After the module $F_1$ associated with the first stage 332 receives the data packet 25, it determines to which module $G_2$ associated with the second stage 334 to send the data packet 25. In some embodiments, for example, the module $F_1$ can use a hash function using as an input the destination identifier and/or the source identifier 23. Based on the inputs, the hash function can generate an identifier associated with a module (e.g., module $G_2$) associated with the second stage 334, and send the data packet 25 accordingly.

After the module $G_2$ associated with the second stage 334 receives the data packet 25, it determines to which module $G_2$ associated with the third stage 336 to send the data packet 25, similar to the module $F_1$. Similarly, after the module $H_2$ associated with the third stage 336 receives the data packet 25, it determines to which edge device $E_3$ to send the data packet 25. After the edge device $E_3$ receives the data packet 25, the edge device $E_3$ can determine to which peripheral processing device $S_6$ to send the data packet 25 and send the data packet 25 accordingly.

If congestion occurs at a module within the switch fabric 330 through which the data packet 25 is sent, the management module 360 can detect the congestion and send a flow control packet 388 accordingly. For example, as shown in FIG. 3A, the data packet is routed through the switch fabric 330 along path 22. After the data packet is received at the module $H_2$ associated with the third stage 336, the data packet is stored within a queue along with other data packets waiting to be sent. If storing the data packet within the queue causes the available capacity of the queue to drop below a threshold, the management module 360 detects the exceeded threshold via path 26 and checks the memory 340 to determine whether a requisite flow control packet has already been sent to the edge device $E_1$. Similarly stated, the management module 360 checks the memory 340 to determine whether the edge device $E_1$ is currently suspending sending data packets to the switch fabric 330 via the port 346 in the appropriate manner, as described in further detail herein.

If the memory 360 indicates that the edge device $E_1$ is currently suspending sending data packets to the switch fabric 330 via the port 346 in the appropriate manner, the management module 360 takes no further action. If the memory 340 indicates that a flow control packet has not been sent to the edge device $E_1$, the management module 340 defines a flow control packet. The flow control packet can include the source identifier 23 of the data packet 25 that caused the queue to exceed the threshold and a suspension time period 384. The flow control packet is sent to the edge device $E_1$ based on the source identifier within the flow control packet via path 24.

In response to receiving the flow control packet, the edge device $E_1$ can take appropriate action to reduce the number of data packets sent to the switch fabric 330. In some embodiments, the flow control packet can cause the edge device $E_1$ to suspend data packets from a single peripheral processing device 370 (e.g., the peripheral processing device $S_1$ that sent the data packet triggering the flow control). In such embodiments, the edge device $E_1$ can continue to transmit data packets from all peripheral processing devices 370 to which it is coupled except the peripheral processing device $S_1$. Such a flow control signal can be called a first control signal. The first control signal can be said to be associated with a first control loop.

In some embodiments, the flow control packet can cause the edge device to prioritize which data packets to send to the switch fabric 330 via link 346. In such embodiments, the edge device $E_1$ can continue to transmit data packets from a first peripheral processing device $S_1$ to the switch fabric 330 while suspending transmission of data packets from a second peripheral processing device $S_2$. Similarly stated, the edge device $E_1$ can prioritize the data packets from $S_1$ over the data packets from $S_2$. In other embodiments, the priority is not based on the source peripheral processing device but on a priority identifier (not shown) appended to each data packet. In such embodiments, the edge device can read the priority identifier appended to each data packet to determine whether to send the data packet to the switch fabric 330 via link 346. Such a flow control signal can be called a second control signal. The second control signal can be said to be associated with a second control loop.

In some embodiments, the flow control packet can cause the edge device $E_1$ to suspend sending data packets (e.g., suspend the data stream) to the switch fabric 330 via the port 346 for a period of time. Similarly stated, the flow control packet turns off port 346 for a period of time. As such, the link between edge device $E_1$ and module $F_1$ is disabled. Such a flow control signal can be called a third control signal. The third control signal can be said to be associated with a third control loop. In some embodiments, a first control signal can be sent when the contents of the queue exceed a first threshold, a second control signal can be sent when the contents of the queue exceed a second threshold and a third control signal can be sent when the contents of the queue exceed a third threshold, as described in further detail herein.

Accordingly, the flow control loops (e.g., first, second and third) can affect different portions of stages of queues spanning the link. As such, the flow control signal associated with the first control loop can trigger different (e.g., more granular) data flow control than the flow control signal associated with the second control loop and the third control loop. Similarly, the flow control signal associated with the second control loop can trigger different (e.g., more granular) data flow control than the flow control signal associated with the third control loop. As such, the third control loop can be said to be nested within the second control loop and the first control loop, and the second control loop can be said to be nested within the first control loop. Similarly, the first control loop can be said to be nested outside of the second control loop and the third control loop, and the second control loop can be said to be nested outside of the third control loop.

The edge device $E_1$ can include a buffer that stores the data packets suspended from being sent to the switch fabric 330 via the port 346 for the period of time. Because the edge device $E_1$ is located outside the switch fabric 330, it can include a buffer larger than the queues on the modules of the switch fabric 330. Thus, it is more appropriate to store data packets within the buffer of the edge device $E_1$ than in the modules of the switch fabric 330.

In some embodiments, after the suspension time period has expired, the edge device $E_1$ resumes sending data packets to the switch fabric 330 via link 346. In other embodiments, a flow control packet can cause the edge device $E_1$ to suspend sending data packets to the switch fabric 330 via link 346 indefinitely. In such embodiments, the edge device $E_1$ suspends sending data packets via port 346 until the edge device $E_1$ receives a second flow control packet instructing the edge device $E_1$ to resume sending data packets to the switch fabric 330 via link 346. The management module 360 can send such a flow control packet to the edge device $E_1$ once the contents of the queue are reduced below a predetermined threshold.

In still other embodiments, the management module 360 can send a flow control packet to modify the suspension time period. In such embodiments, for example, if the available capacity of the queue rises above a threshold, the management module 360 can send a flow control packet to reduce the suspension time period. Similarly, if after a time period the available capacity of the queue remains below a threshold, the management module 360 can send a flow control packet to increase the suspension time period.

While shown in FIG. 3A as having a single management module 360 and a single memory 340, in other embodiments, each module within the switch fabric 330 can include a management module 360 and/or a memory 340. In such embodiments, each management module can send flow control signals to the edge devices when an available capacity of the queue co-located with the management module is less than a threshold. Additionally, the memory on the module of the switch fabric can keep track of the flow control signals sent by the management module on its module of the switch fabric. In such embodiments, the management modules can be said to be distributed.

Figure 4:
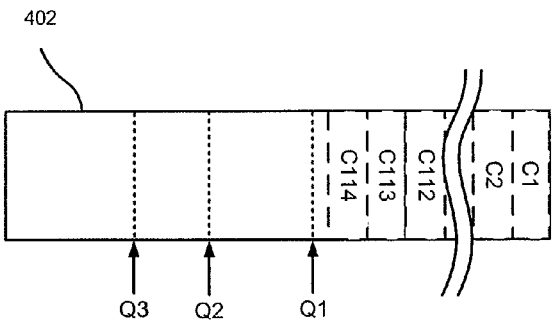
FIG. 4 is a schematic illustration of a queue, according to another embodiment.

FIG. 4 is a schematic illustration of a queue 402, according to another embodiment. The queue 402 can be similar to the queues described above in relation to the modules of the switch fabric 330. As such, the queue is configured to buffer data packets C1-C114 at a module associated with a stage of a switch fabric before they are sent to a module associated with the next stage of the switch fabric or an edge device. Similarly stated, the queue 402 stores each data packet when received at the module until the module is ready to send the data packet to a module associated with the next stage or an edge device.

The queue includes a first threshold Q1, a second threshold Q2 and a third threshold Q3. The first threshold Q1 is associated with a management module sending a first flow control packet to an edge device, the second threshold Q2 is associated with a management module sending a second flow control packet to an edge device, and the third threshold Q3 is associated with the management module sending a third flow control packet to an edge device. As such, when a data packet causes the available capacity of the queue 402 to fall below the first threshold Q1, the management module sends the first flow control packet to an edge device identified by the source identifier (see e.g., FIG. 3B) of the data packet. Similarly, when a data packet causes the available capacity of the queue 402 to fall below the second threshold Q2 or the third threshold Q3, the management module sends the second flow control packet or the third flow control packet, respectively, to an edge device identified by the source identifier (see e.g., FIG. 3B) of the data packet.

The first flow control packet is part of a first control loop. Accordingly, the first flow control packet is sent via a first flow control signal and is configured to cause the edge device to suspend transmitting data packets from a single peripheral processing device identified by the source identifier of the data packet that caused the available capacity of the queue 402 to fall below the first threshold Q1. Such a first flow control signal reduces the number of data packets sent to the switch fabric by the edge device.

The second flow control packet is part of a second control loop. Accordingly, the second flow control packet is sent via a second flow control signal and is configured to cause the edge device to suspend transmitting low priority data packets. In some embodiments, the priority of a data packet is determined by the peripheral processing device from which the data packet originated. In other embodiments, each data packet includes a header with a priority indicator that represents the priority level of the data packet. Such a second flow control signal further reduces the number of data packets sent to the switch fabric by the edge device.

The third flow control packet is part of a third control loop. Accordingly, the third flow control packet is sent via a third flow control signal and is configured to cause the edge device to suspend transmitting any data packets to the switch fabric via the port identified by the source identifier of the data packet that caused the available capacity of the queue 402 to fall below the third threshold Q3. Such a third flow control signal further reduces the number of data packets sent to the switch fabric by the edge device.

In some embodiments, the duration of the suspensions caused by the first flow control packet, the second flow control packet and the third flow control packet can be a predetermined amount of time identified in a suspension time period portion of the flow control packets. In other embodiments, the suspensions can last indefinitely. In such embodiments, for example, each suspension can last until the management module sends a flow control packet causing the edge device to end the particular suspension.

Figure 5A:
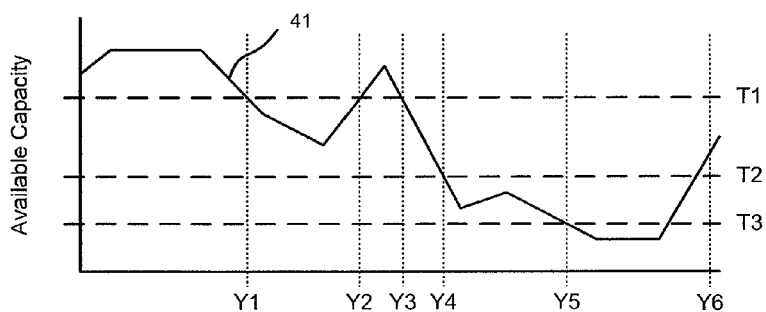
FIGS. 5A-5D are timing diagrams associated with a queue, according to another embodiment.

FIGS. 5A-5D are timing diagrams illustrating the three types of thresholds (first, second, and third) discussed above with respect to FIGS. 3A and 4. Line 41 in FIG. 5A illustrates an available capacity of a queue over a time period. The line T1 represents a first threshold associated with a first flow control signal (e.g., Q1 shown and described with respect to FIG. 4), the line T2 illustrates a second threshold associated with a second flow control signal (e.g., Q2 shown and described with respect to FIG. 4), and the line T3 illustrates a third threshold associated with a third flow control signal (e.g., Q3 shown and described with respect to FIG. 4).

Figure 5B:
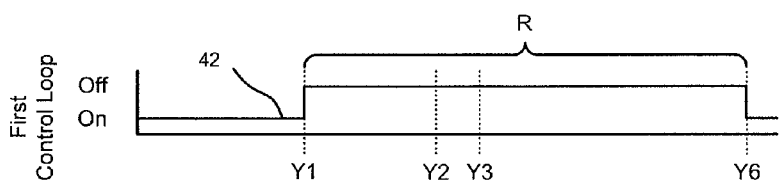

FIG. 5B illustrates the status of the first control loop over the time period illustrated in FIG. 5A. The line 42 illustrates the state (e.g., on/off) of the first control loop at a particular edge device. As shown in FIG. 5A, prior to time Y1, the available capacity of the queue is above the first threshold T1. Accordingly, the first control loop is in its on state and the edge device is operating normally and sending data packets from the peripheral processing devices to which it is coupled to the switch fabric. When the available capacity of the queue (line 41) drops below the first threshold T1 at time Y1, the first control loop switches from its on state to its off state (line 42). As discussed above, this can be caused by a management module sending an first flow control signal to the edge device. As a result, the edge device suspends transmitting data packets from a single peripheral processing device identified by the source identifier of the data packet that caused the available capacity of the queue to fall below the first threshold T1 to the switch fabric.

As shown in FIGS. 5A and 5B, the first control loop remains in its off stage for a predetermined amount of time R regardless of whether the available capacity of the queue exceeds the first threshold T1. For example, between times Y2 and Y3, the available capacity of the queue is above the first threshold T1 (line 41) but the first control loop remains in its off state (line 42). Further, the first control loop switches from its off state to its on state (line 42) after the predetermined amount of time R regardless of the available capacity of the queue. For example, the first control loop switches from its off state to its on state (line 42) at time Y6 even though the available capacity is below T1 at Y6. In some embodiments, the first control loop can return to its off state if a subsequent data packet is stored in the queue while the available capacity remains below the first threshold T1. In such embodiments, the management module not only sends first flow control signals to the switch fabric when storing a data packet causes the available capacity of the queue to drop below the first threshold T1, but also sends first flow control signals to the switch fabric when a data packet is stored in the queue while the available capacity of the queue is below the first threshold T1 and the first control loop is in its on state. The memory associated with the management module can maintain the state information about the first control loop, as described above.

In other embodiments, the first control loop remains in its off state after the predetermined amount of time R if the available capacity remains below the threshold T1. For example, the first control loop can remain in the off state for another time period equal to the predetermined amount of time R. In such embodiments, the first control loop can receive state information from the management module to determine whether to switch the first control loop from its off state to its on state after the predetermined amount of time R has elapsed.

Figure 5C:
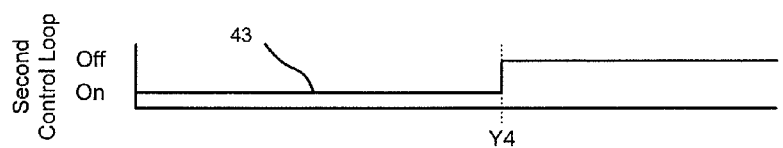

FIG. 5C illustrates the status of the second control loop over the time period illustrated in FIG. 5A. The line 43 illustrates the state (e.g., on/off) of the second control loop at a particular edge device. As shown in FIG. 5A, prior to time Y4, the available capacity of the queue is above the second threshold T2. Accordingly, the second control loop is in its on state and the edge device is sending low priority data packets to the switch fabric. When the available capacity of the queue (line 41) drops below the second threshold T2 at time Y4, the second control loop switches from its on state to its off state (line 43). As discussed above, this can be caused by a management module sending a second flow control signal to the edge device. As a result, the edge device suspends transmitting lower priority data packets to the switch fabric via a port (or a link) identified by the source identifier of the data packet that caused the available capacity of the queue to fall below the second threshold T2.

Figure 5D:
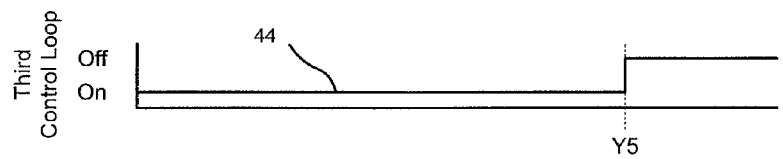

Similarly, FIG. 5D illustrates the status of the third control loop over the time period illustrated in FIG. 5A. The line 44 illustrates the state (e.g., on/off) of the third control loop at a particular edge device. As shown in FIG. 5A, prior to time Y5, the available capacity of the queue is above the third threshold T3. Accordingly, the third control loop is in its on state and the edge device is sending data packets to the switch fabric. When the available capacity of the queue (line 41) drops below the third threshold T3 at time Y5, the third control loop switches from its on state to its off state (line 44). As discussed above, this can be caused by a management module sending a third flow control signal to the edge device. As a result, the edge device suspends transmitting data packets to the switch fabric via a port (or a link) identified by the source identifier of the data packet that caused the available capacity of the queue to fall below the third threshold T3.

Figure 6:
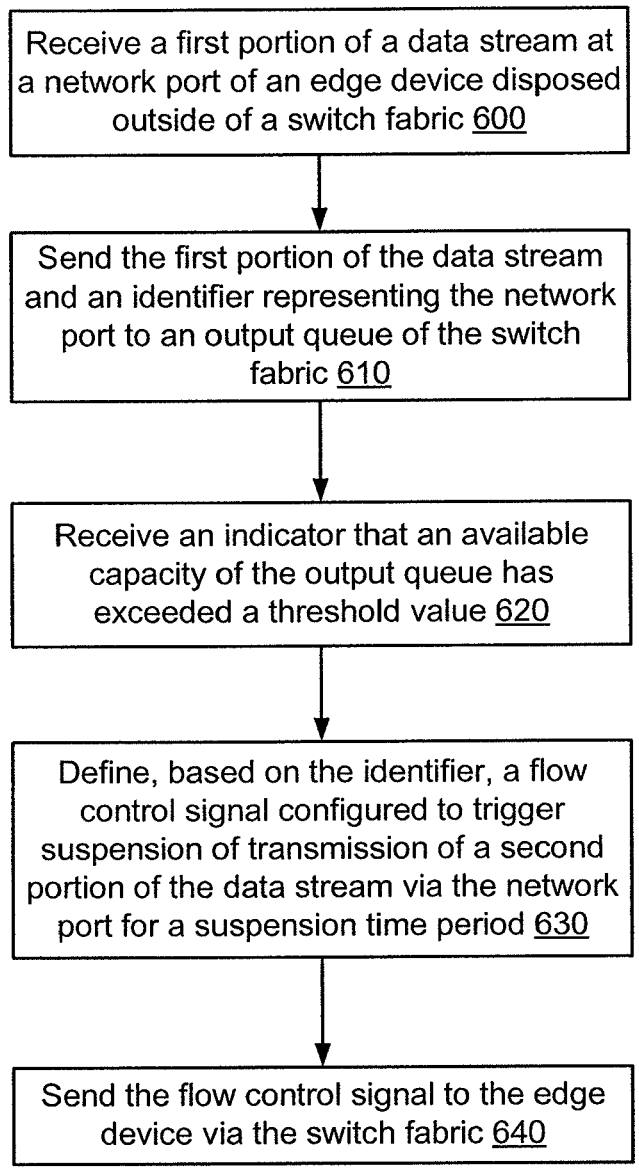
FIG. 6 is a flowchart that illustrates a method for sending a flow control signal, according to an embodiment.

FIG. 6 is a flowchart that illustrates a method for sending a flow control signal, according to an embodiment. The method includes receiving a first portion of a data stream at a network port of an edge device disposed outside of a switch fabric, at 600. The edge device, the network port and the switch fabric can be structurally and functionally similar to the edge device E1, the network port 346 and the switch fabric 330, respectively, shown and described with respect to FIG. 3A. The first portion of the data stream can include multiple data packets and/or data cells.

The first portion of the data stream and an identifier representing the network port are sent to an output queue of the switch fabric, at 610. The output queue of the switch fabric can be a queue on a module associated with a final stage of the switch fabric. For example, the module associated with a final stage of the switch fabric can be similar to the modules $H_1$-$H_N$, shown and described with respect to FIG. 3A. The output queue can be similar to the queue 402, shown and described with respect to FIG. 4.

An indicator that an available capacity of the output queue has exceeded a threshold value is received, at 620. The indicator can be received by a management module structurally and functionally similar to the management module 360, shown and described with respect to FIG. 3A. In some embodiments, the module containing the output queue actively monitors the output queue and sends the indicator in response to determining that the available capacity of the output queue has exceeded the threshold value. In other embodiments, the management module actively monitors the output queue to determine that the available capacity of the output queue has exceeded the threshold value.

A flow control signal configured to trigger suspension of transmission of a second portion of the data stream via the network port for a suspension time period is defined based on the identifier, at 630. Such a flow control signal can be defined by the management module and can be similar to the flow control packet 388 shown and described with respect to FIG. 3C. As such, the suspension time period can be included in the flow control signal. The flow control signal can be a first flow control signal, a second flow control signal and/or a third flow control signal, as described above.

The flow control signal is sent to the edge device via the switch fabric, at 640. The flow control signal directs the edge device to suspend the transmission of the second portion of the data stream for the suspension time period.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as being a three-stage switch fabric, in other embodiments, the switch fabric can include any number of stages. In some embodiments, for example, the switch fabric can be a five stage switch fabric similar to the switch fabric shown and described in U.S. patent application Ser. No. 12/345,500, filed on Dec. 29, 2008, and entitled System Architecture for a Scalable and Distributed Multi-Stage Switch Fabric," and U.S. patent application Ser. No. 12/345,502, filed on Dec. 29, 2008, and entitled "Methods and Apparatus Related to a Modular Switch Architecture," each of which is incorporated herein by reference in its entirety.

In some embodiments, the flow control systems and/or methods described herein can be used with other flow control systems and/or methods. For example, a switch fabric system can include flow control between modules within the switch fabric. In such embodiments, a first module within the switch fabric can send suspension signals to a second module within the switch fabric from which the first module is receiving data packets and/or data cells when the available capacity of a queue at the first module is less than a threshold. Such flow control systems and methods can be similar to the flow control systems and methods shown and described in U.S. patent application Ser. No. 12/345, 490, filed Dec. 29, 2008, entitled "Flow-Control in a Switch Fabric," which is incorporated herein by reference in its entirety.

In some embodiments, the flow control systems and/or methods described herein can be used with an edge flow control loop, a priority flow control loop and/or a link flow control loop similar to the edge flow control loops, the priority flow control loops and the link flow control loops shown and described in U.S. patent application Ser. No. 12/242,224, filed on Sep. 30, 2008, entitled "Methods and Apparatus for Flow Control Associated with Multi-Staged Queues;" U.S. patent application Ser. No. 12/242,230, filed Sep. 30, 2008, entitled "Methods and Apparatus for Flow-Controllable Multi-Staged Queues;" and U.S. patent application Ser. No. 12/558,118, filed Sep. 11, 2009, entitled "Methods and Apparatus for Defining a Flow Control Signal Related to a Transmit Queue;" each of which is incorporated herein by reference in its entirety.

While shown and described above as having three thresholds, a queue can include any number of thresholds associated with any number of control loops. In some embodiments, other control loops can be defined to cause an edge device to suspend sending data packets and/or cells to the switch fabric based on any criteria. For example, the edge device can suspend sending data packets to the switch fabric based on the size of the data packet, a destination of a data packet, the contents of the data packet, and/or the like.

While the management module is described above as sending a flow control packet to an edge device when storing a data packet causes the available capacity of a queue to drop below a threshold, in some embodiments, other events can cause the management module to send a flow control packet to the edge device. For example, if the available capacity of a queue is already below a threshold when a data packet is stored in the queue, the management module can send a flow control packet to the edge device associated with the source identifier of the packet if the memory indicates that the edge device is not currently in a suspended state. Such a situation can occur if suspending the edge device from sending data to the switch fabric for a first suspension time period does not increase the available capacity of the memory such that the available capacity is above the threshold. After the first suspension time period the edge device can resume sending data packets to the switch fabric. Accordingly, a data packet stored in the queue after the first suspension time period and before the available capacity of the queue is above the threshold will cause the management module to send a flow control packet to the edge device, suspending the edge device from sending data packets to the switch fabric for a second time period.

As another example, in some embodiments, the management module can be configured to define a flow control packet at regular time intervals. For example, the management module can be configured to define a flow control packet every 10 ms. In such embodiments, a flow control packet including the appropriate suspension instructions (e.g., what ports need to be suspended for what amount of time) can be sent to an edge device ever 10 ms. In other embodiments, a flow control packet can be sent at any other interval, for example, every 5 ms, every 20 ms, and/or the like. In some embodiments, the flow control packet can be sent to every edge device at the regular time intervals. In such embodiments, each edge device can parse through the flow control packet to learn of the suspension instructions appropriate to that edge device. Additionally, in such embodiments, every edge device is notified of the state information of the other edge devices.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
    a switch fabric including at least a first switch stage and a second switch stage;
    an edge device operatively coupled to the switch fabric and configured to send a first portion of a data stream, from a first source device operatively coupled to a network port of the edge device to the switch fabric via a source port of the edge device such that the first portion of the data stream is received at a queue of the second switch stage of the switch fabric via the first switch stage of the switch fabric, the edge device configured to be operatively coupled to a second source device, the source port of the edge device associated with a source port identifier; and
    a management module configured to detect, in response to the first portion of the data stream being received at the queue of the second switch stage of the switch fabric, a congestion level of the queue of the second switch stage of the switch fabric satisfying a condition,
    the management module configured to send, to the edge device, a flow control signal addressed to the edge device and including the source port identifier, the flow control signal configured to trigger the edge device to suspend transmission of a second portion of the data stream from the first source device via the network port of the edge device in response to the management module detecting the congestion level, the flow control signal configured to allow the edge device to continue to transmit a data packet from the second source device to the switch fabric.

2. The apparatus of claim 1, wherein the switch fabric is defined based on a Clos architecture.

3. The apparatus of claim 1, wherein at least one of the first switch stage of the switch fabric or the second switch stage of the switch fabric is defined by a plurality of integrated Ethernet switches.

4. The apparatus of claim 1, wherein the edge device is further configured to identify a destination network port based on classification of the first portion of the data stream performed at the edge device.

5. The apparatus of claim 1, wherein the management module is further configured to communicate with the edge device via a communication channel that is out-of-band from communication channels of the switch fabric.

6. An apparatus, comprising:
    an edge device configured to be operatively coupled to a switch fabric and configured to associate an identifier representing a network port of the edge device with a first packet received from a first source device, the edge device configured to send the first packet and the identifier to a portion of the switch fabric, the edge device configured to be operatively coupled to the first source device and a second source device; and
    a management module operatively connected to the edge device via a direct connection and configured to detect, in response to the first packet being received at the portion of the switch fabric, a congestion level of the portion of the switch fabric satisfying a condition,
    the management module configured to define, based on the identifier, a flow control signal configured to trigger suspension of transmission via the network port of a second packet from the first source device, the management module configured to send the flow control signal in response to the management module detecting the congestion level, the flow control signal configured to allow the edge device to continue to transmit a data packet from the second source device to the switch fabric via the network port, the flow control signal including the identifier representing the network port of the edge device.

7. The apparatus of claim 6, wherein the first packet is an Ethernet packet, and the identifier representing the network port is included in a header concatenated to the Ethernet packet.

8. The apparatus of claim 6, wherein the network port is a source network port, the edge device is configured to identify a destination network port based on classification of the first packet performed at the edge device, and the first packet is routed through the switch fabric based on an identifier representing the destination network port.

9. The apparatus of claim 6, wherein the portion of the switch fabric is an output queue associated with a destination network port.

10. The apparatus of claim 6, wherein the switch fabric defines at least a core portion of a data center.

11. An apparatus, comprising:
    a switch fabric including at least a first switch stage and a second switch stage;
    an edge device operatively coupled to a first source device and the switch fabric and configured to send a first portion of a data stream, received from the first source device, to the switch fabric via a network port of the edge device such that the first portion of the data stream is received at a queue of the second switch stage of the switch fabric via the first switch stage of the switch fabric, the edge device configured to be operatively coupled to a second source device, the network port of the edge device being identified by a network port identifier; and a management module operatively connected to the edge device via a direct connection and configured to detect, in response to the first portion of the data stream being received at the queue of the second switch stage of the switch fabric, a capacity of the queue of the second switch stage of the switch fabric dropping below one of a plurality of predetermined thresholds, the management module configured to send, to the edge device, a flow control signal addressed to the edge device to trigger the edge device to suspend transmission of a second portion of the data stream from the first source device via the network port of the edge device in response to the management module detecting the capacity, the flow control signal including the network port identifier, the flow control signal configured to allow the edge device to continue to transmit a data packet from the second source device to the switch fabric.

12. The apparatus of claim 11, wherein the management module is further configured to send, to the edge device, a priority level identifier that corresponds to the one of the plurality of predetermined thresholds.

13. The apparatus of claim 11, wherein the management module is operatively coupled to a memory and configured to store a history of sent flow control signals in the memory.

* * * * *